United States Patent [19]

Kobayashi

[11] Patent Number: 5,004,619

[45] Date of Patent: Apr. 2, 1991

[54] PRODUCTION METHOD OF FORMING SOLID STATE FOOD MATERIAL COMPLETELY WRAPPED AND SEALED IN A CLAYISH STATE FOOD MATERIAL

[76] Inventor: Masao Kobayashi, 413-2, Nittazuka, Fukui-shi, Fukui-ken, Japan

[21] Appl. No.: 355,681

[22] Filed: May 23, 1989

Related U.S. Application Data

[62] Division of Ser. No. 156,802, Feb. 17, 1988, Pat. No. 4,854,842.

[30] Foreign Application Priority Data

Feb. 25, 1987 [JP] Japan ................... 62-43629

[51] Int. Cl.⁵ ............... A23P 1/08; A23P 1/10
[52] U.S. Cl. ................... 426/297; 426/512; 426/516
[58] Field of Search ......... 426/516, 297, 512; 425/133.1, 132, 131.1; 264/148, 6

[56] References Cited

U.S. PATENT DOCUMENTS

| | | | |
|---|---|---|---|
| 3,572,259 | 3/1971 | Hayashi | 426/94 |
| 4,229,484 | 10/1980 | Steels et al. | 426/279 |
| 4,251,201 | 2/1981 | Krysiak | 264/142 |
| 4,260,640 | 4/1981 | Hartmann et al. | 426/516 |
| 4,416,910 | 11/1983 | Hayashi et al. | 426/516 |
| 4,446,160 | 5/1984 | Shinriki | 426/297 |
| 4,589,833 | 5/1986 | Hayashi | 264/141 |
| 4,643,904 | 2/1987 | Brewer et al. | 426/516 |
| 4,648,821 | 3/1987 | Thulin | 426/516 |
| 4,659,580 | 4/1987 | Svengren | 426/516 |
| 4,689,236 | 8/1987 | Pinto | 426/516 |
| 4,734,024 | 3/1988 | Tashiro | 426/516 |
| 4,788,071 | 11/1988 | Hayashi et al. | 426/516 |

Primary Examiner—Donald E. Czaja
Assistant Examiner—D. Workman
Attorney, Agent, or Firm—Staas & Halsey

[57] ABSTRACT

The invention as disclosed herein relates to a process for wrapping and sealing on the circumference of a solid state food material with one or two kinds of clayish state food material in layer condition, thereby forming the same into globular shape. A gate is used to cause the clayish state material to envelope a solid state material as it exits a mould.

3 Claims, 22 Drawing Sheets

PRODUCTION METHOD OF FORMING SOLID STATE FOOD MATERIAL COMPLETELY WRAPPED AND SEALED IN A CLAYISH STATE FOOD MATERIAL

This is a divisional application Ser. No. 07/156,802 filed Feb. 17, 1988, now U.S. Pat. No. 4,854,842.

BACKGROUND OF THE INVENTION

1. Field of the Invention

This invention relates to an apparatus for wrapping and sealing completely solid state food material with the clayish state food material and for forming this wrapped and sealed food goods into globular shape. This invention, in details, shall produce the clayish state food material such as DOUGH, SOFT AND STICKY RICE CAKE, GROUND MEAT, MINCED MEAT, MASH-POTATO and so on into globular shape, into the inside of which one piece or plural pieces of the solid state food material such as MAROON, STRAWBERRY, NUTS BOILED EGGS, SQUARE CHOPPED MEAT and so on are placed with complete sealing. For example, this invention relates to the fields of confectionery, food and food processing.

2. Description of the Related Art

In the past, there was no apparatus to produce wrapped foods, such as a maroon bun (inside maroon, outside dough), strawberry-jelly (inside strawberry, outside jelly) and BAKUDAN-ODEN = Japanese Particular goods (inside boiled egg, outside ground meat). These were made by human hands, wherefore the working procedure is very unsanitary and time consuming. In view of such situations, the present inventor pioneered a new mass production method of wrapping food, and apparatus —globular cutting down apparatus (to be referred to U.S. Pat. No. 4,398,881) —to supply the clayish state food material from a pushing die in the tubular shape while a smaller guide tube is set for the supply of the solid state food material.

The aforesaid apparatus, however, sometimes causes some inconveniences; according to the nature of the clayish state food material air comes together with the solid state food material. This extra air causes it not to be sticky enough for the clayish state food material to combine smoothly with the solid state food material. In other words, the clayish food material and the solid state food material shall become separated, which shall deteriorate the merit of the relative food.

SUMMARY OF THE INVENTION

It is an object of the present invention to provide an apparatus for forming solid state food material completely wrapped and sealed with clayish state food material into globular shape in a desirable condition without incurring the inadequate condition for smooth sticky status.

It is another object of this invention to provide an apparatus for shutting out air during the manufacturing procedure.

It is still another object of this invention to provide an apparatus for running the relative procedure automatically without exposure of the food to human hands.

It is still a further object of this invention to provide an apparatus for making all procedures smoothly with high efficiency and good sanitation.

It is a further object of this invention to provide an apparatus for forming the additional layer of the clayish state food material further over the above processed goods into globular shape. In other words, two layers of the clayish state food material shall be formed with the inside of the solid state food material.

An apparatus for wrapping and sealing solid state food material with the clayish state food material, and forming the same into globular shape, includes an upper part of a closed gate, on which are one or two kinds of the clayish state food material arranged with the relative clayish state food material as even layer through pushing work means, whereon the solid state food material is supplied. At the same time the gate is opened, the solid state food material together with the clayish food material is pushed downwards through gate mouth by pushing out means. The circumference of the solid state food material is then wrapped and sealed with the clayish state food material and then formed into globular shape. Finally, the gate is closed and the clayish food material is cut out, and the globular food goods is then obtainable.

The foregoing objects and other objects as well as the characteristics of the present invention will become more apparent and more readily understandable by following descriptions.

BRIEF DESCRIPTION OF THE DRAWINGS

FIG. 21 is a sectional view showing the magnified drawings of the gate part and the shutter part, respectively;

DETAILED DESCRIPTION OF THE PREFERRED EMBODIMENTS

Figure 1:
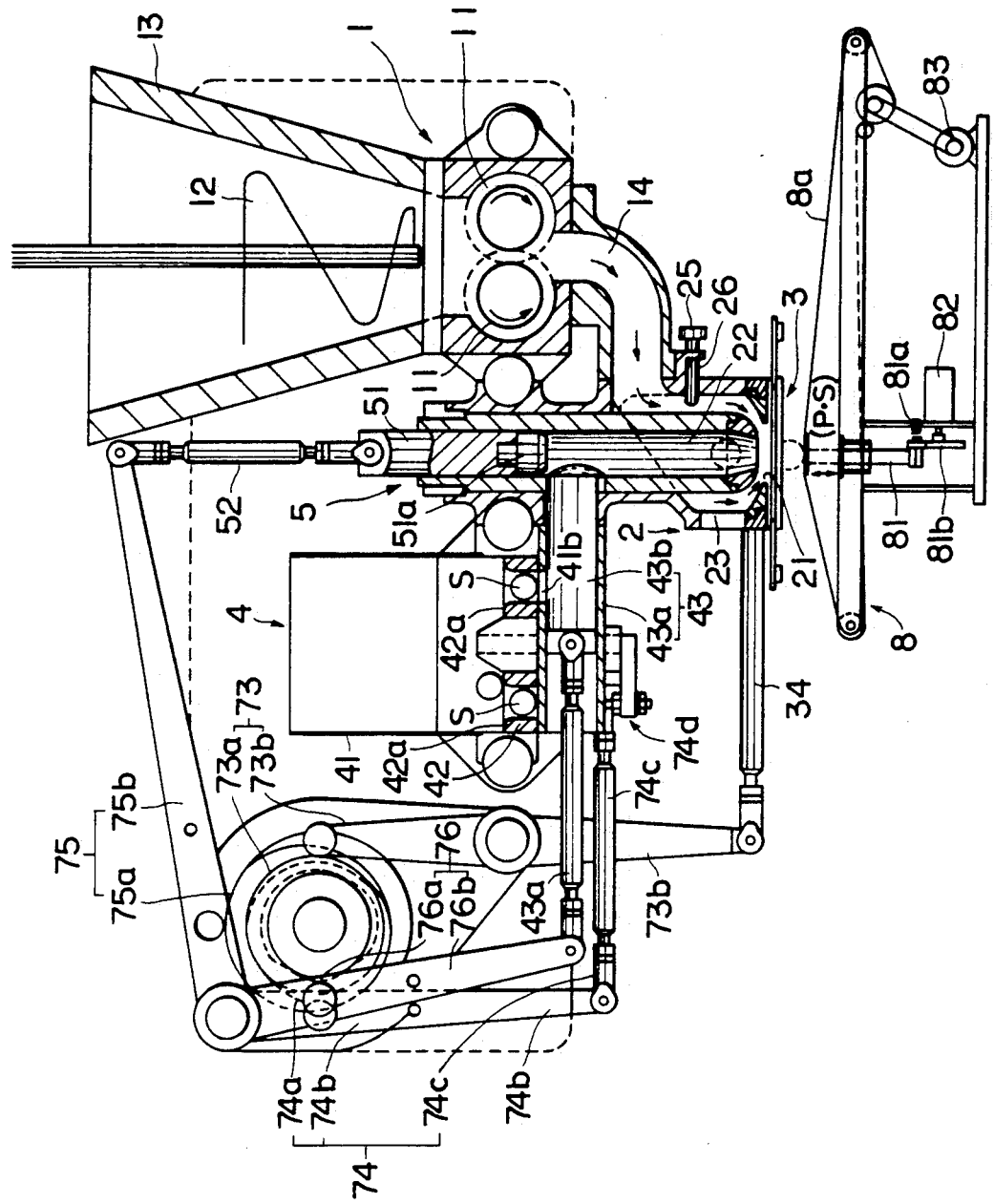
FIG. 1 is a diagrammatic elevational view of an apparatus in its entirety, in accordance with the invention, showing the first performance step.

Referring to FIG. 1, in accordance with the invention, the relative apparatus for forming the solid state food material completely wrapped and sealed with the clayish state food material into globular shape is shown.

Figure 19:
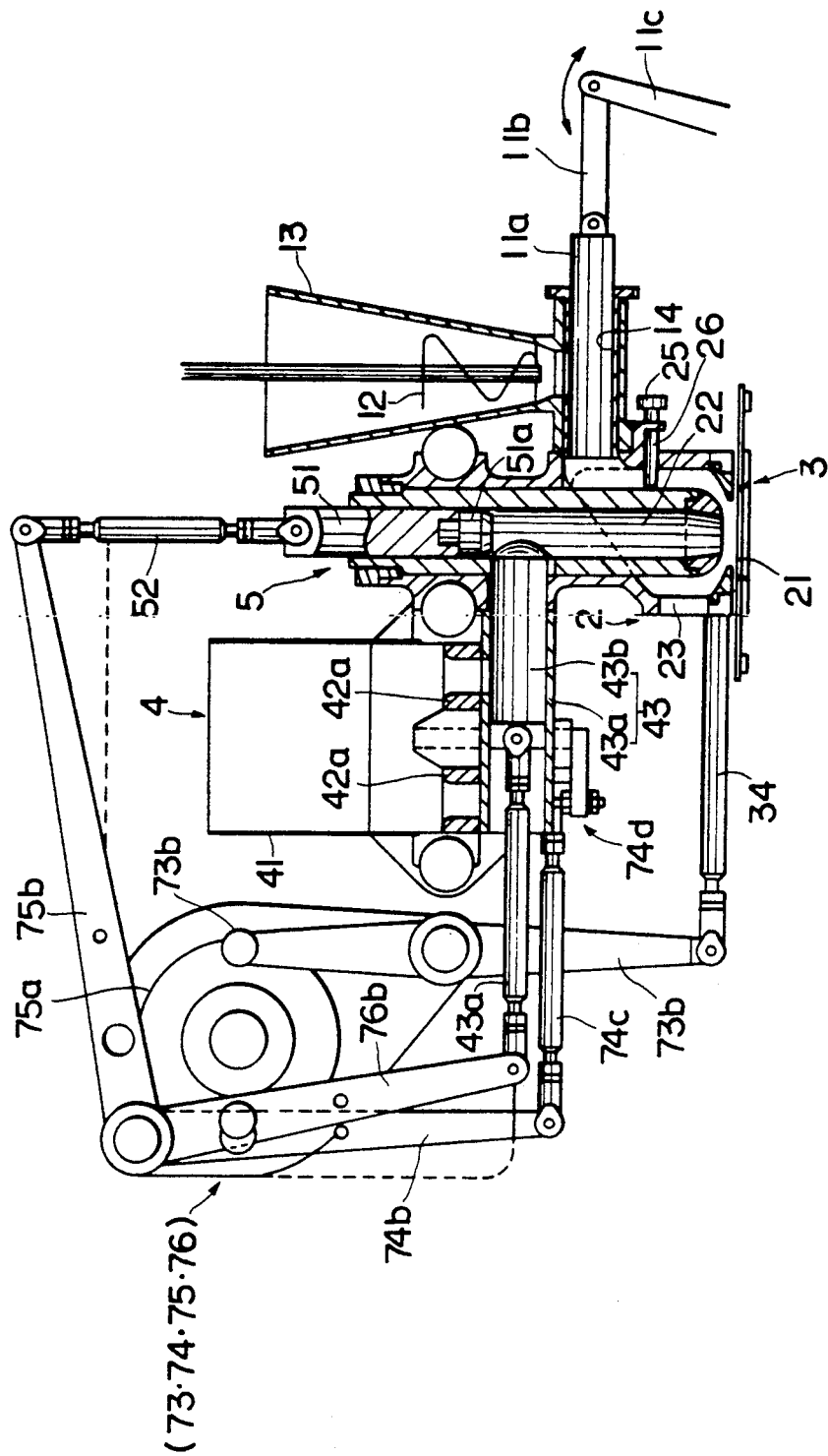
FIG. 19 is an explanatory drawing showing some example of the transformed method for pushing work means of the clayish good material.
Figure 20:
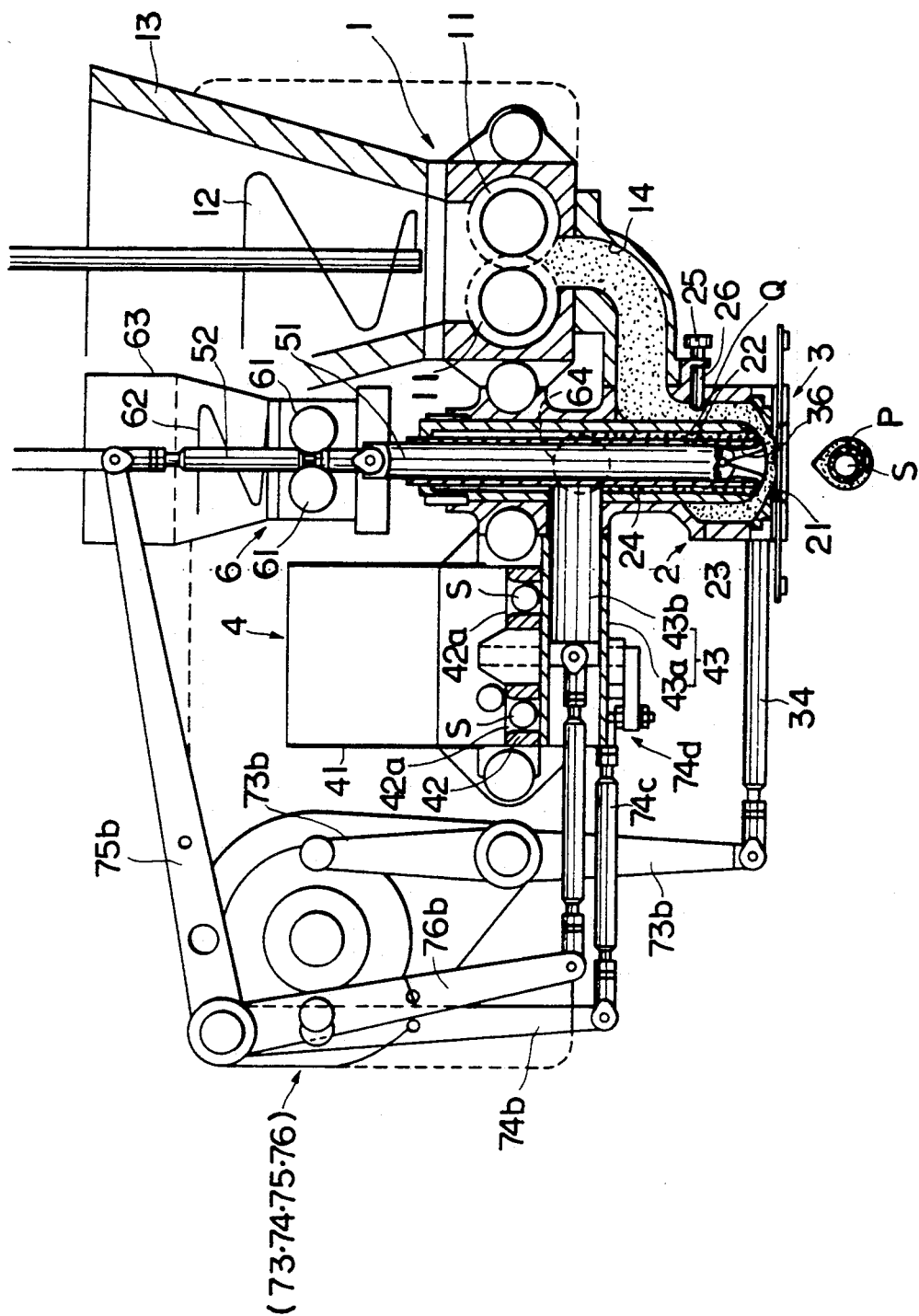
FIG. 20 is a diagrammatic elevational view of an apparatus in its entirety, showing the second performance step.

Numeral (1) is an extruder with built-in gear pump mechanism (11) and equipped with hoper (13) on the upper part and With feathered screw (12) which is operated properly by the power of invertor motor or similar means (not shown). Thus, clayish state food material is transferred into supply path (14) in due course. As a different transferring means, other than gear pump mechanism, a piston mechanism (11a, 11b, 11c) can be also adopted as per FIG. 19. A screw conveyor mechanism could also be available.

Numeral (2) is the means for periodically pushing out the mould with output passage (21) on its bottom. As shown on the drawing, this mould means has the cylindrical chamber (22) wherein the solid state food material is inserted and it also has cavity (23) connecting to supply path (14) wherein the clayish state food material is driven. In the meantime, output passage (21) in this means shall be opened periodically by operation of a gate (3) which has a shutter-type mechanism for opening and closing the passage (21).

Numeral (25) is the adjusting knob which controls the flow of the clayish food material. When the clayish state food material exists in cavity (23), the correct operation to and fro of the relative knob shall prevail the clayish state food material evenly in cavity (23) by the moving action of regulating plate (26) near the connecting point between supply passage (14) and cavity (23).

Figure 15:
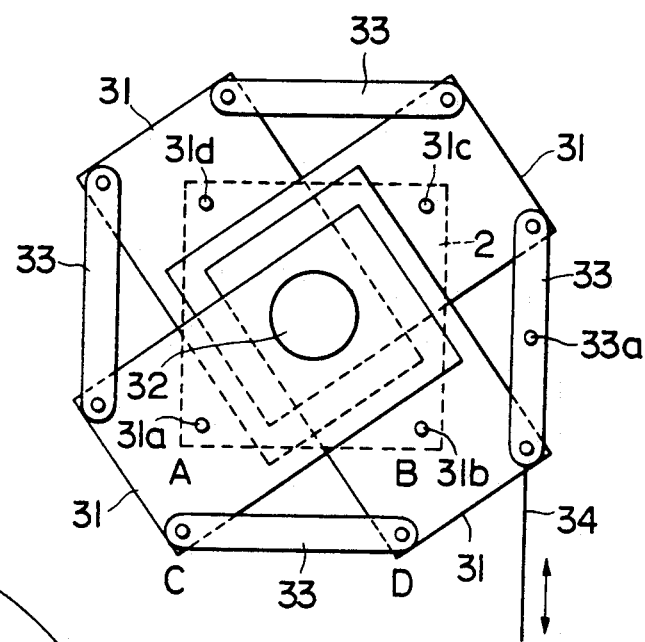
FIG. 15 is an explanatory view of the gate part only in open condition.
Figure 16:
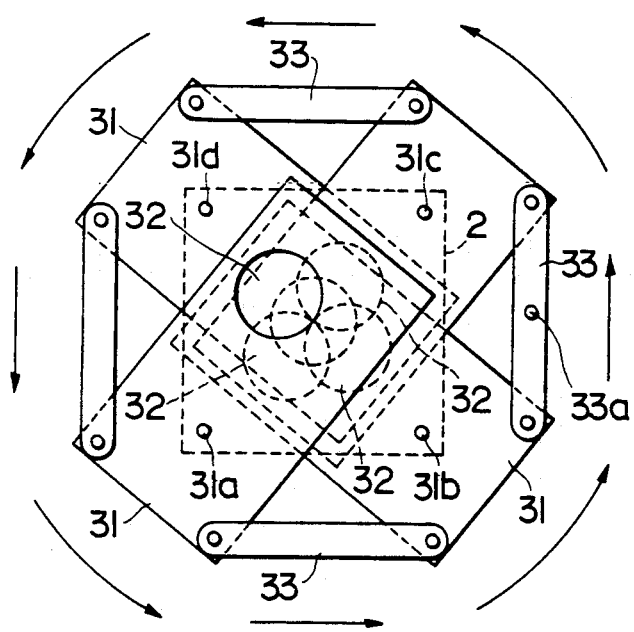
FIG. 16 is an explanatory view of the gate part showing the movement of the closed condition.

As shown on FIG. 15 and FIG. 16, the gate 3 is pivoted with pivot pin (31a, 31b, 31c, 31d) in movable condition, and on the edge of operating side there lies gate mouth (32) in four plates (31). These four plates move in one accord with the operation for opening and closing correspondingly, whereas on the edge side of each plate they are interconnected by four links (33) in facing with the pivot pins (31a, 31b, 31c, 31d) respectively. Driving bar (34) is connected with one linking pin (33a) and this causes the movement on these links and gate plates accordingly.

Numeral (4) is the means for supplying the solid state food material. It has a hopper (41) wherein the solid state food material is containable and it has also measuring turnframe (42) in its lower part, wherefrom the solid state food material shall be fallen downwards by the periodical movement of the bottomless sectional frame through hopper hole (41b). Supply means (4) also has a transferring mechanism of the solid state food material (43), which is equipped with path (43a) (for the run of the solid state food material), and also with built-in piston (43b) pushing the solid state food material into chamber (22).

Figure 2:
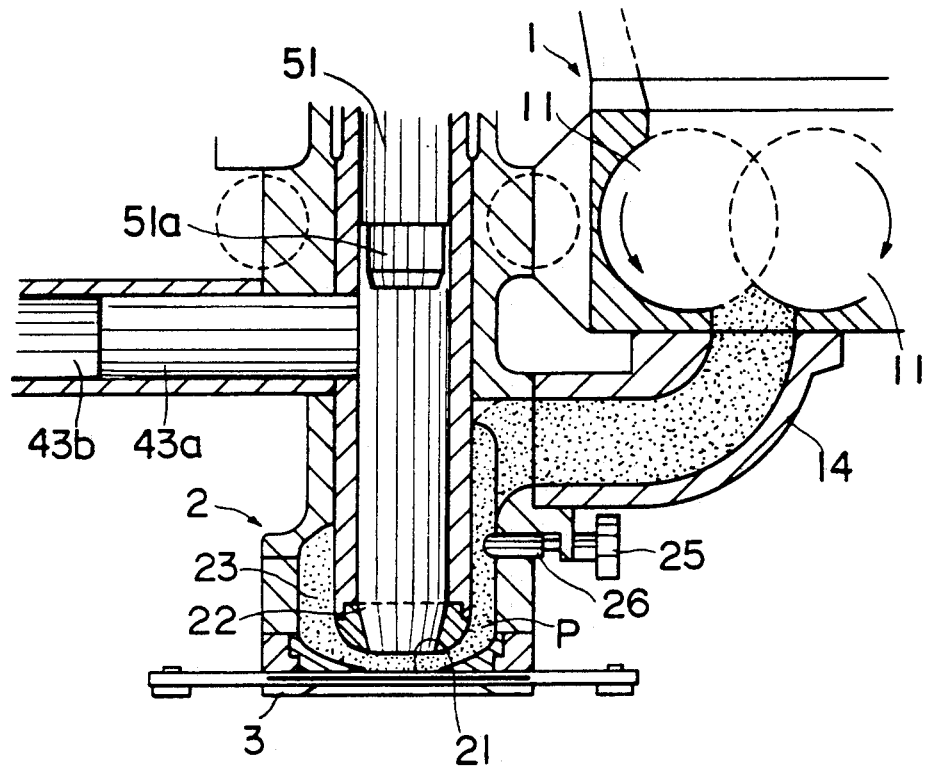
FIGS. 2 to FIG. 8 are the explanatory drawings of working procedures.
Figure 3:
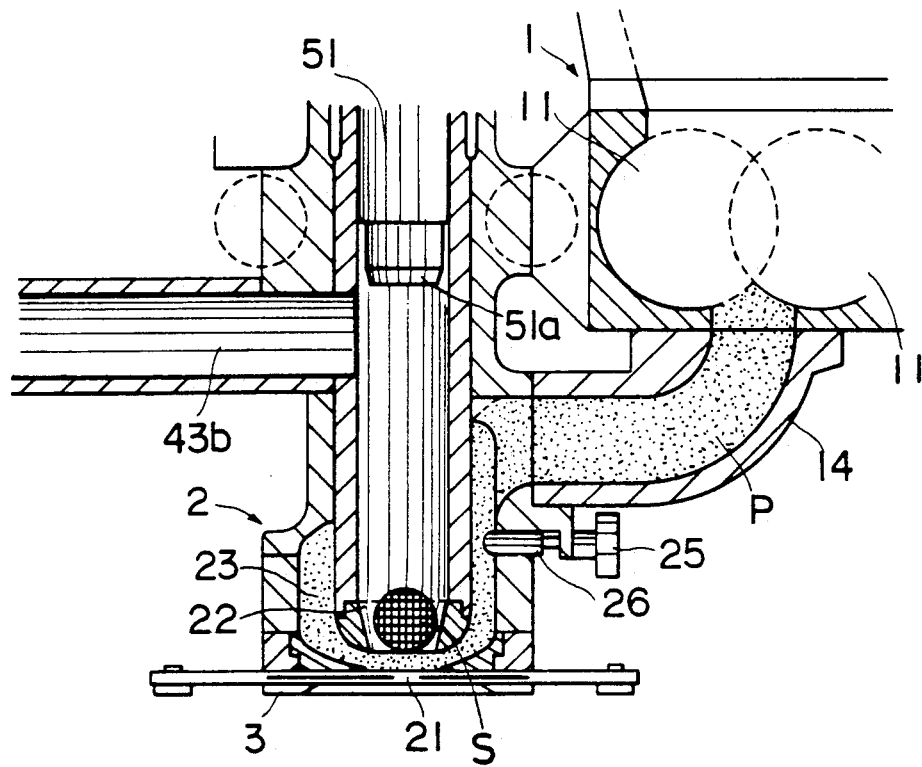
Figure 4:
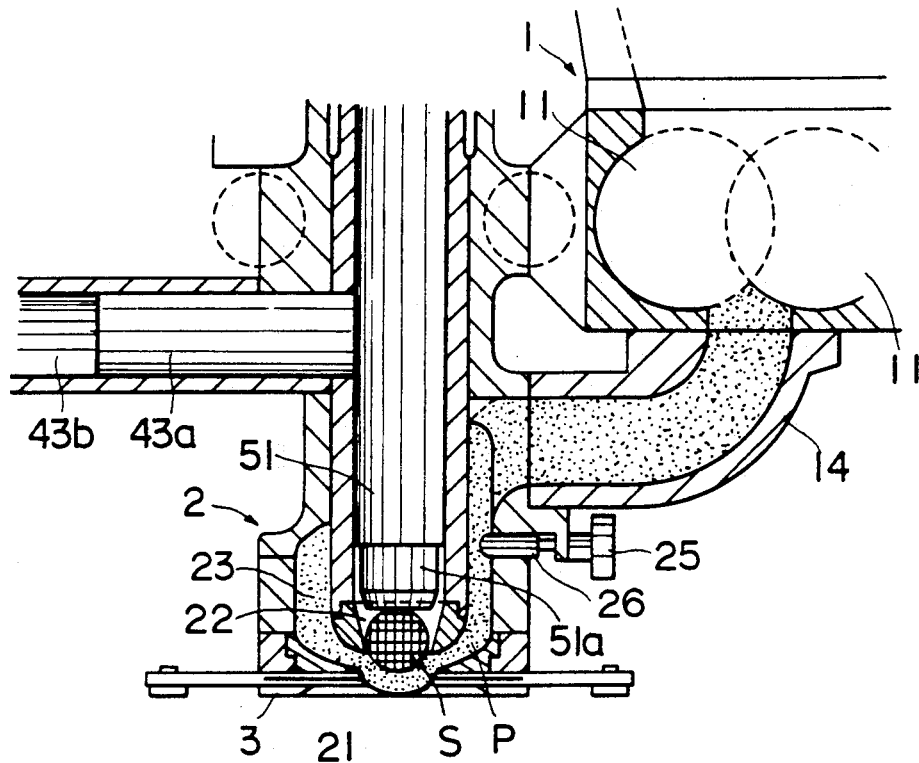
Figure 5:
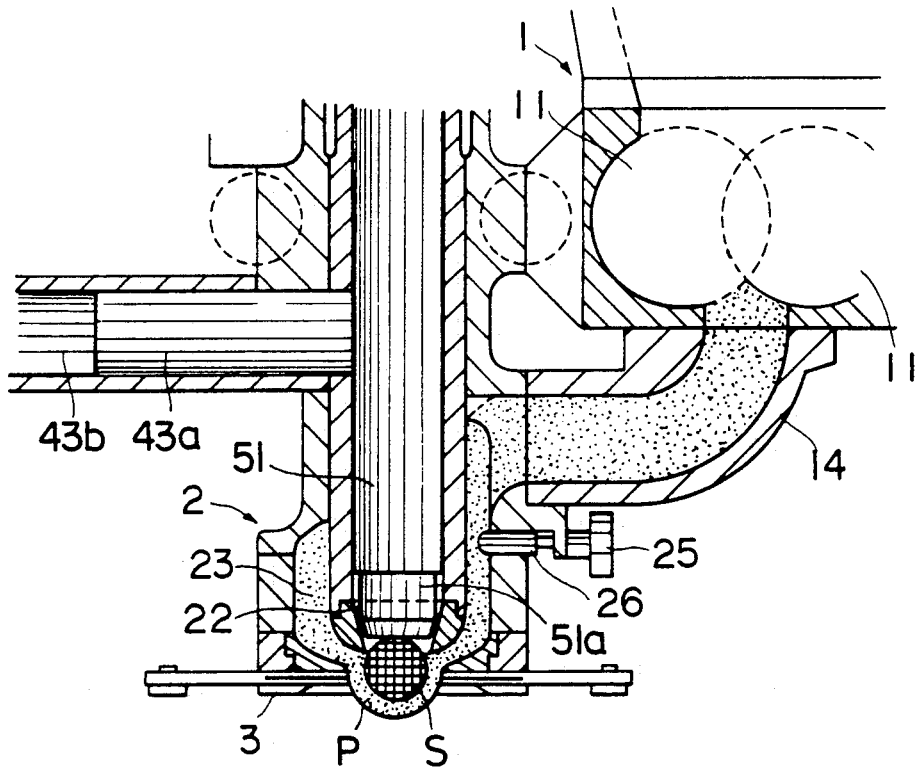

Numeral (5) is the means for pushing out work. It has the piston (51), which pushes out the solid state food material to output passage (21), and it also has an elevating rod (52). In the drawings of FIG. 1–FIG. 3, on the top of piston (51), the cover (51a) is set. This cover is made of silicon rubber material (fluorine) or fluoridated plastic material, preventing the food material from sticking.

This cover is not always necessary, and it shall be substituted by the fluoridating coat over on the top of piston itself. The extruder (1), gate (3), the means for supplying the solid state food material (4), and the means for pushing out work (5) are actuated by periodically corresponding actuator mechanism (73) (74) (75) (76). This corresponding mechanism is based on a "cam tappet" system. Extruder (1) transfers the solid state food material through the following movement: cam tappet (73) which includes cam (73a) and vibrating lever (73b) move driving bar (34) of gate (3), whereon it connects to switch "on or off" the inverter motor (not on the drawing). The motor operates the gear pump mechanism (11) and feathered screw (12). Switching "on" is indicated when gate (3) is opened and switching "off" is indicated when gate (3) is closed.

The means for supplying the solid state food material (4) is timely taken by the following movement: cam (74a) and vibrating lever (74b) and recessing bar (74c) effect measuring turnframe periodically by rounding movement, when the solid state food material existed in section frame (42a) shall be correctly transferred into path (43a) through the movement of rachet mechanism (74d).

In the meantime, the solid state food material existed in path (43a) shall be pushed into chamber (22) forcibly by the movement of piston (43b) affected by cam (76a) and vibrating lever (76b).

The means for pushing out work (5) is operated such that when the solid state food material is inserted into chamber (22) surrounded by prevailed clayish state food material by the corresponding movement of cam (75a), vibrating lever (75b) connected to elevating rod (52), gate (3) of output passage (21) starts to open. Also, the solid state food material is pushed out toward gate (3) through output passage (21). Then, the circumference of the solid state food material shall be completely wrapped and sealed with the clayish state food material.

Below the output passage (21), there is a belt conveyor (8), where the completed food material in globular shape shall be correctly accepted and prepared for available conveyance. Numeral (81) is a lifter set which operates a lift conveyor face (8a). Lifter 81 is synchronized with cam tappet (73) and the movement of gate (3). When gate (3) is opened, a special signal issues in the way of a relay system. The relative relay signal is accepted at the connecting point (81a), whereas brake-motor (82) is operated automatically for rotating cam (81b). The belt conveyor (8) is operated exactly as above, and then the conveyor brake-motor is correctly operated in accordance with procedures.

Figure 17:
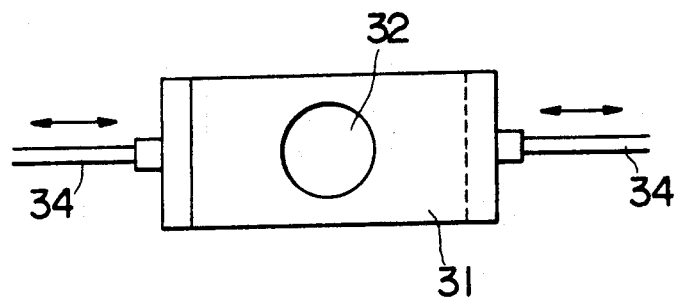
FIG. 17 is a partially flat view of the gate showing other mechanisms.
Figure 18:
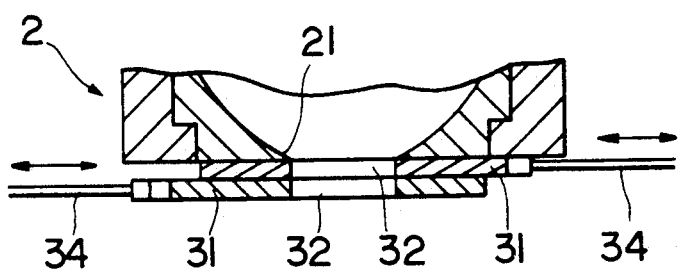
FIG. 18 is a partially sectional view of the gate showing the same mechanisms of the above FIG. 17.

This invention is not only limited in the aforesaid embodiment, but also includes other modifications. For instance, the mechanism of extruder (1) can be replaced by other well-known transferring mechanisms using the usual moulding machine, vacuum moulding machine. The means for supplying the solid state food material (4) can be replaced by a so-called "feeding doll mechanism". The means for pushing out (5) can be replaced by an air cylinder mechanism. The corresponding actuator mechanism (73) (74) (75) can be replaced by a microcomputer control mechanism. With regard to gate (3), it can be changeable to, for instance, as shown in FIG. 17 and FIG. 18 wherein two sheets of gate plate (31) on gate mouth (32) shall move to a different direction relative to each other in accordance with the directional arrow.

The following is an example of the production procedure of Japanese cake called "Momoyama" using the apparatus of the present invention. The clayish state food material "P": Kneaded flour with yolk and white bean jam. The solid state food material "S": A plum soaked with candied sugar. First, insert Material "P" into hopper (13) of extruder (1), and insert Material "S" into hopper (41) in plural pieces while gate (3) is closed.

For starting the operation, the gear pump mechanism (11) is driven and feathered screw (2) and make cavity (23) spinning as shown in FIG. 2. When the normal operation starts, Material "S" in hopper (41) shall fall into path (43a) via hole (41b) out of sectional frame (42a) by the turning movement of measuring turnframe (42). Then, at the same time, piston (43b) starts to push material "S" into chamber (22) accordingly. When material "S" comes into chamber (22), pushing piston (51) starts to fall down and gate (3) starts to open gradually. Material "S" comes out through output passage (21) by the movement of extruder (1). When gate opens further wider, pushing piston (51) helps to pass material "S" through putout passage (21) by its pushing power in the downward direction. After the above procedure, the surroundings of material "S" are wrapped and sealed completely with material "P".

Figure 6:
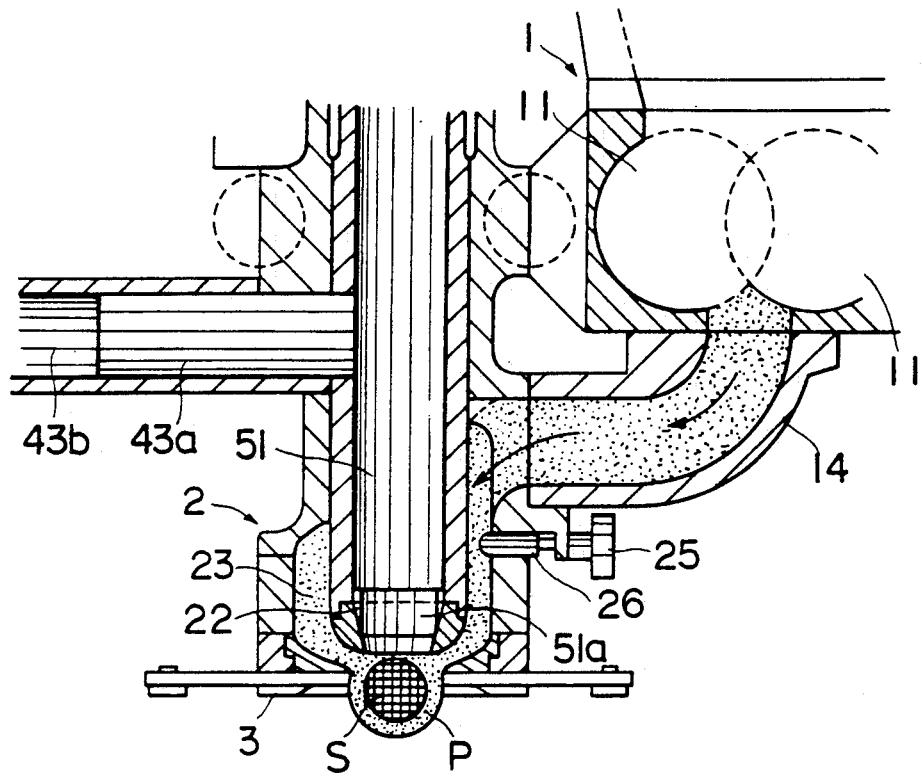
Figure 7:
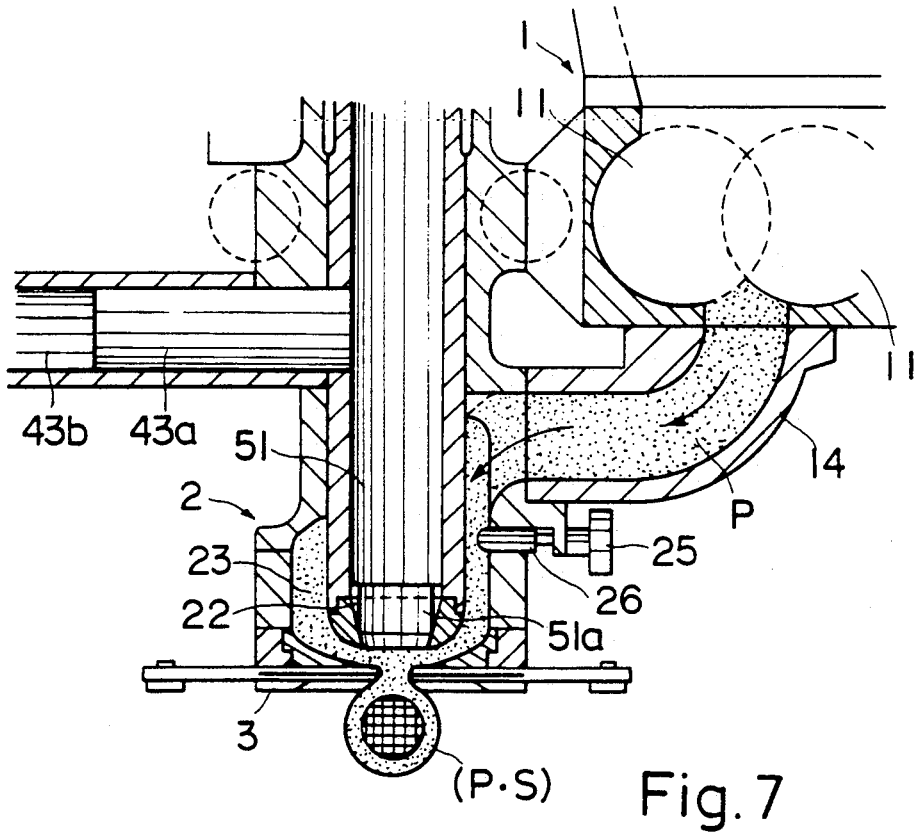
Figure 8:
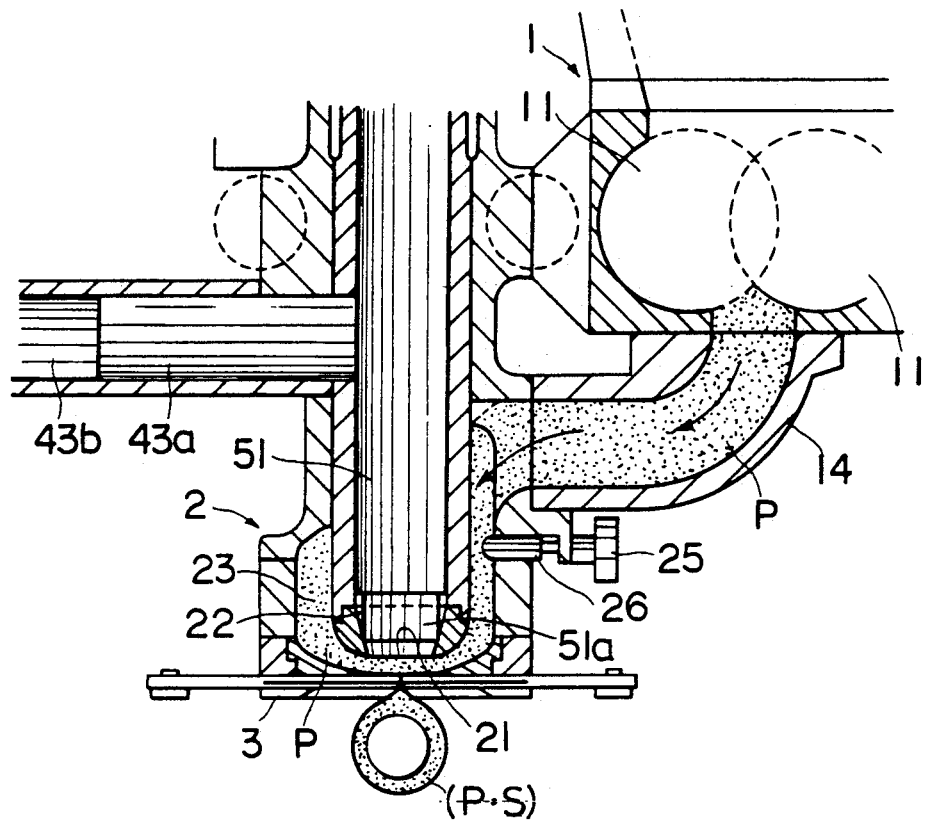
Figure 11:
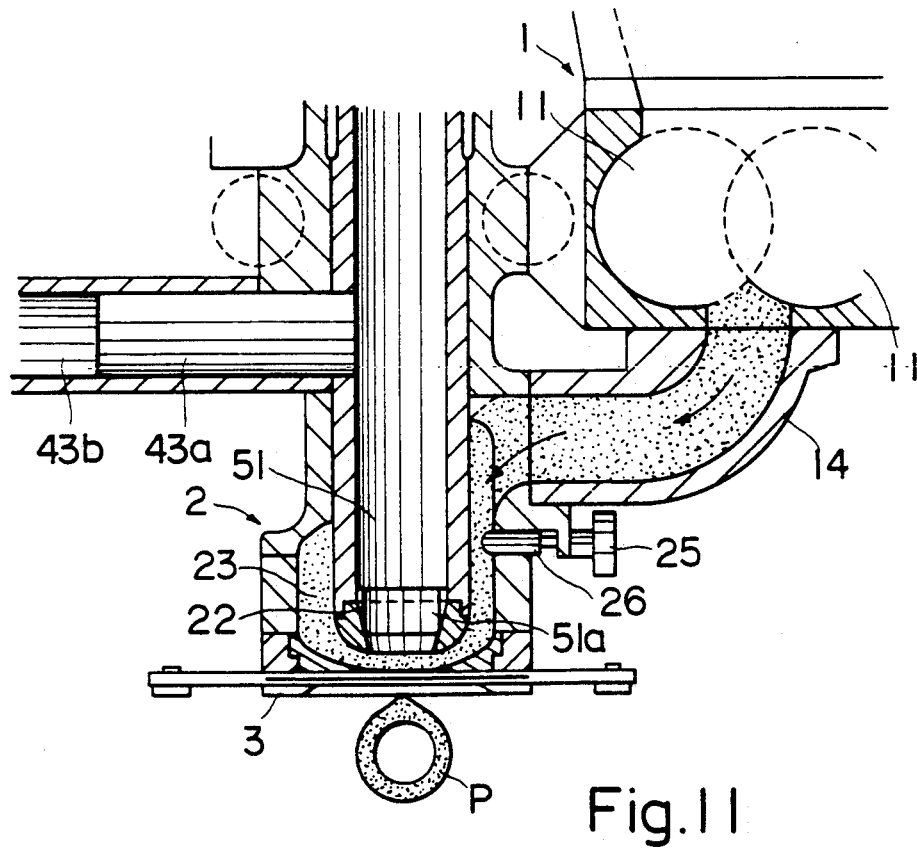
FIG. 11 is an explanatory drawing showing the final procedure in which only the clayish material is processed without any solid state food material.

As shown on FIG. 6, the wrapped and sealed material "P & S" comes out through passage (21). Then, gate (3) starts to close, whereas the relative material shall be formed into the globular shape in its procedure as illustrated in FIG. 7 and FIG. 8. In case the above procedure goes on without material "S", the wrapping and sealing shall be made without any inside material, in other words, "EMPTY" as shown in FIG. 11.

Figure 9:
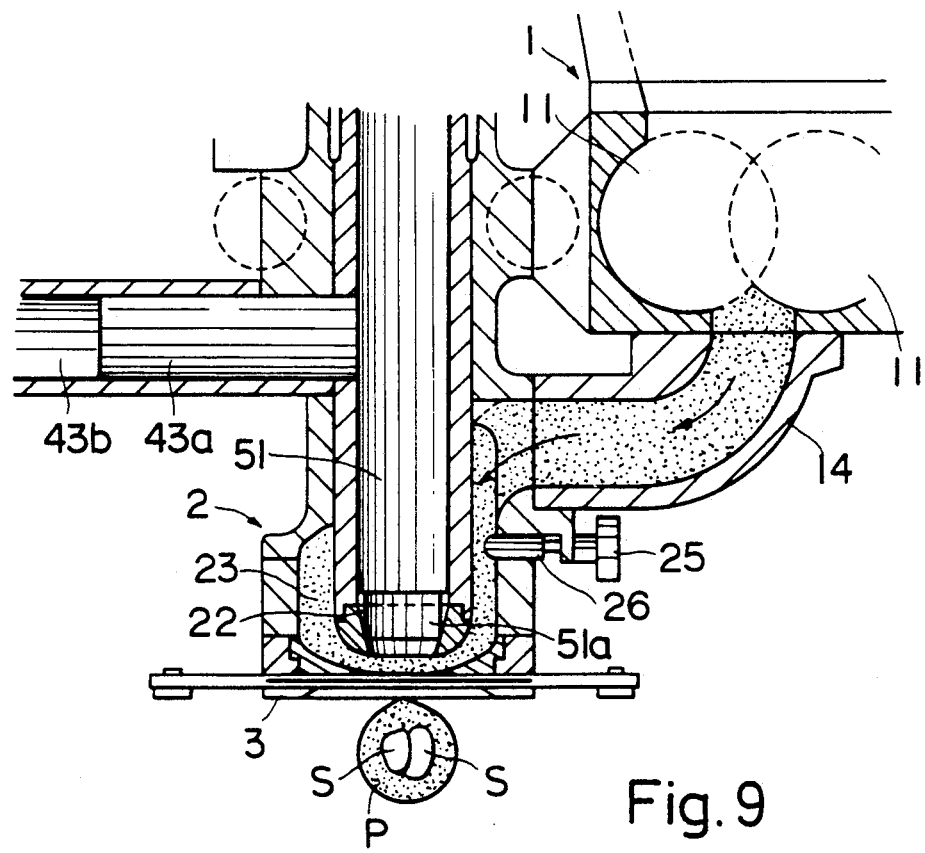
FIG. 9 is an explanatory drawing showing the final procedure in which two pieces of the solid state food material are wrapped and sealed by the clayish state food material.
Figure 10:
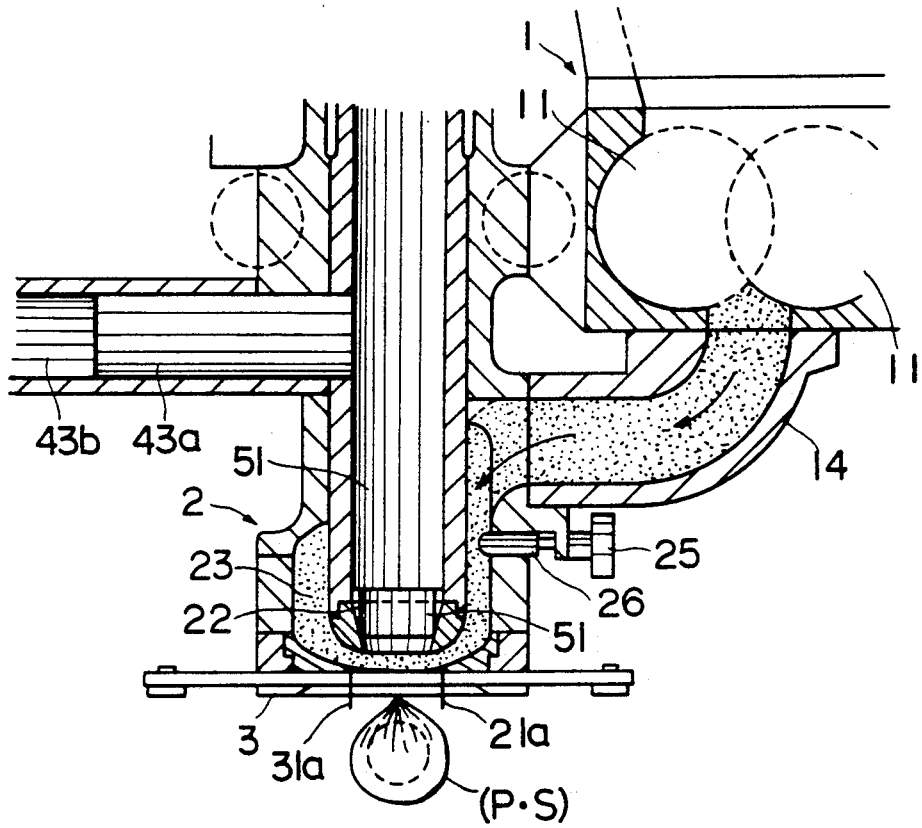
FIG. 10 is an explanatory drawing showing the final procedure in which the top of the globular shaped food is cutting down like a cone-shaped hat.
Figure 12:
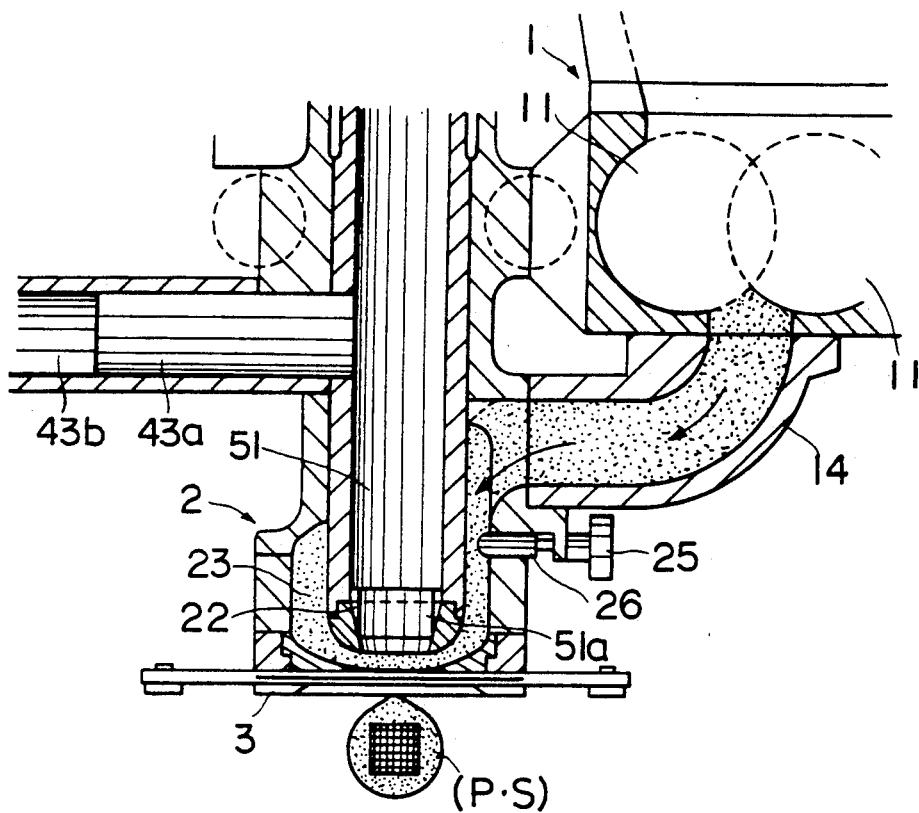
FIG. 12 is an explanatory drawing showing the final procedure in which the solid state food material in the square shape is wrapped and sealed by the clayish state food material.
Figure 13:
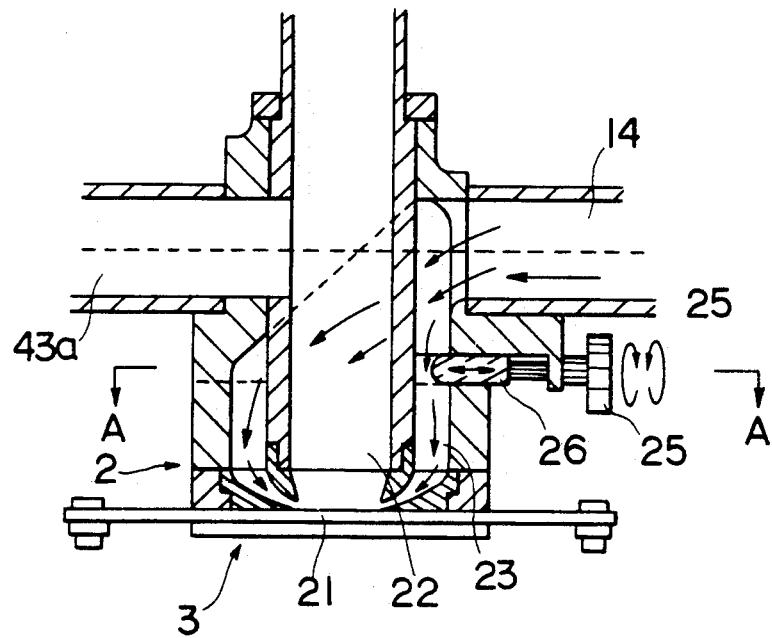
FIG. 13 is a partially sectional vertical view of the adjusting part in which the flow of the clayish state food material is properly adjusted from an extruder into a cavity.
Figure 14:
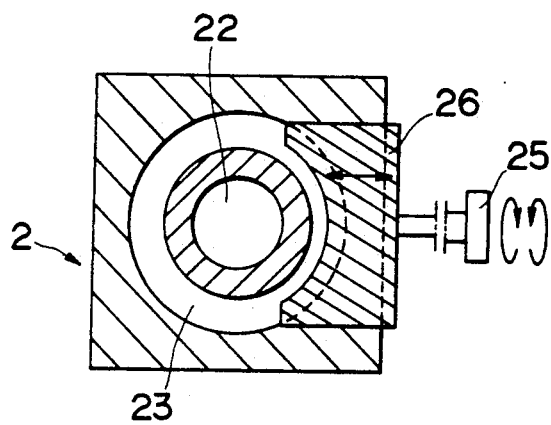
FIG. 14 is a partially sectional horizontal view of the above FIG. 13 along the line A—A.

The cycle of the procedure is explained as above, but this invention shall not only relate to the above production procedure, but also relates to a great variety of other food products. For example, as shown in FIG. 9, two pieces of material "S" (such as almonds) are wrapped and sealed with material "P". As shown in FIG. 10, when a cylindrical cloth (21a) is hung at output passage (21), the top of globular shape is formed like a cone-shaped hat. Also, as shown in FIG. 12, the square cut Yokan (Japanese confectionery-sweet jelly of beans) is also available to be wrapped and sealed. This invention shall make it possible to produce the globular shaped food consisted of material "S" and material "P" in smooth succession and of higher efficiency. As mentioned, the present invention has improved performance, i.e., not to incur the separation of material "S" and material "P". It is useful in the confectionery field as well as other food production or processing industry in its good sanitation and in its high production quantity.

Figure 21A:
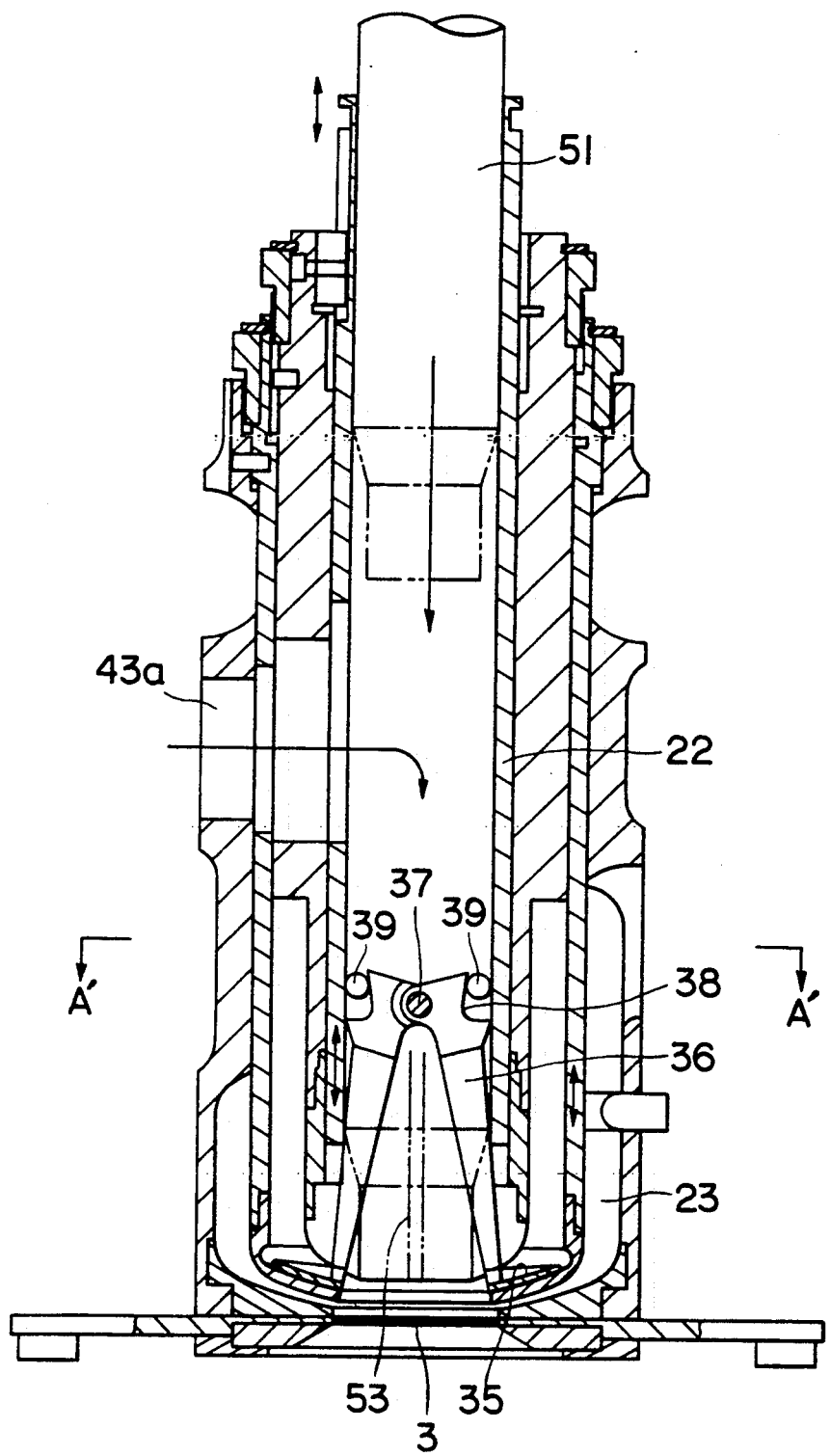
FIG. 21a is a front view of the above FIG. 21.
Figure 21B:
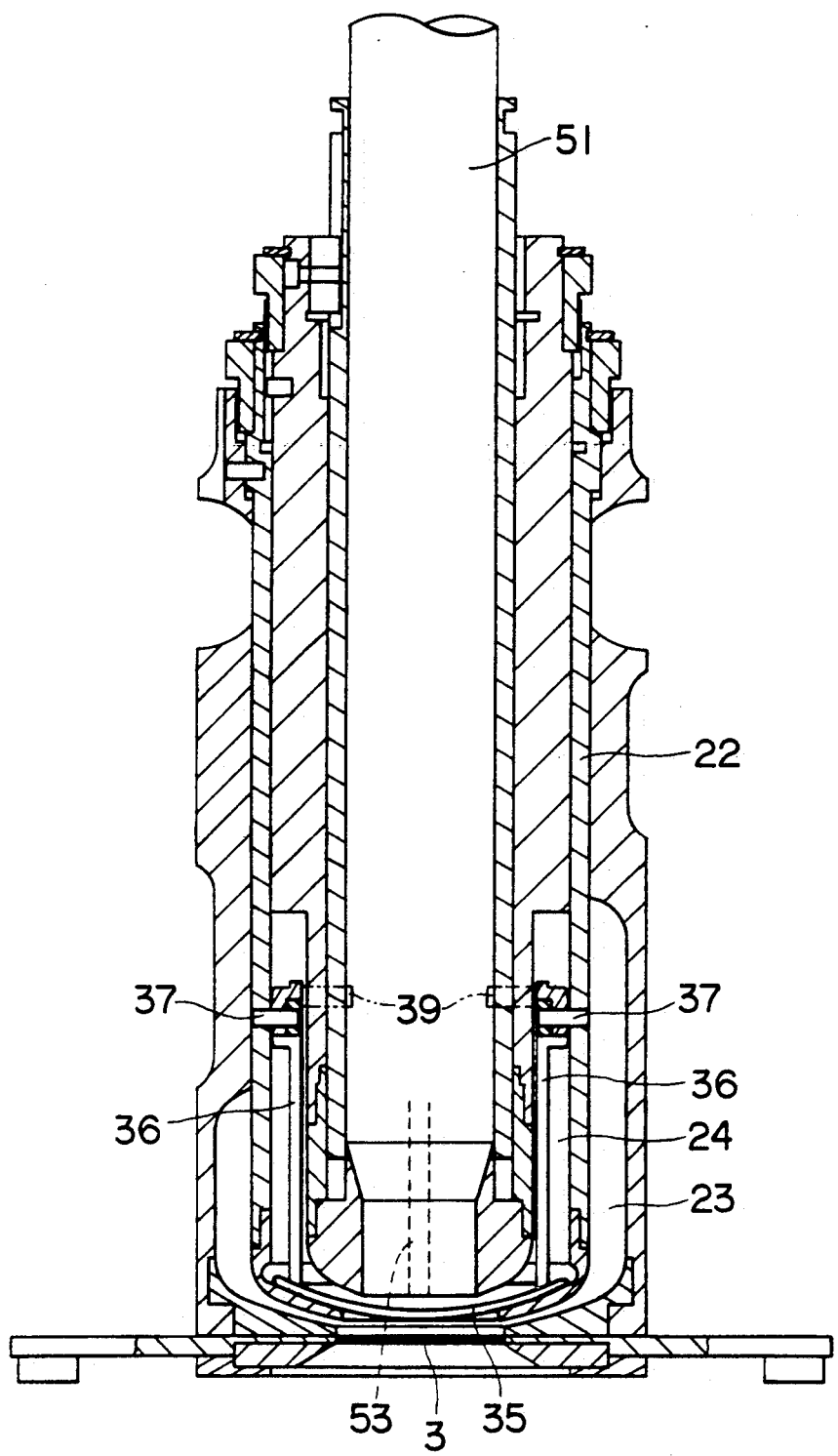
FIG. 21b is a side view of the above FIG. 21.
Figure 22:
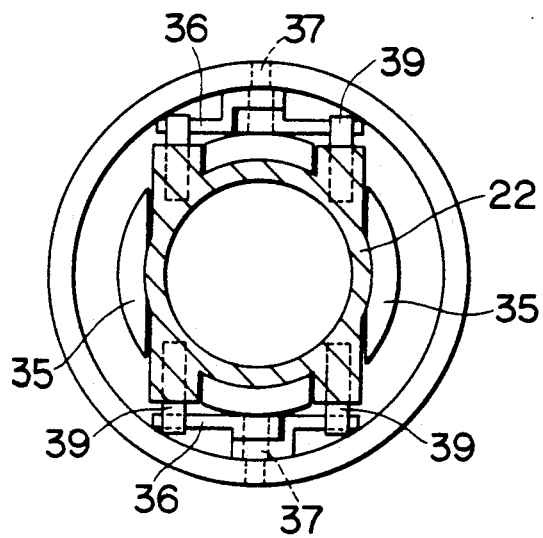
FIG. 22 is a transverse sectional view of FIG. 21a along line A'—A'.
Figure 23:
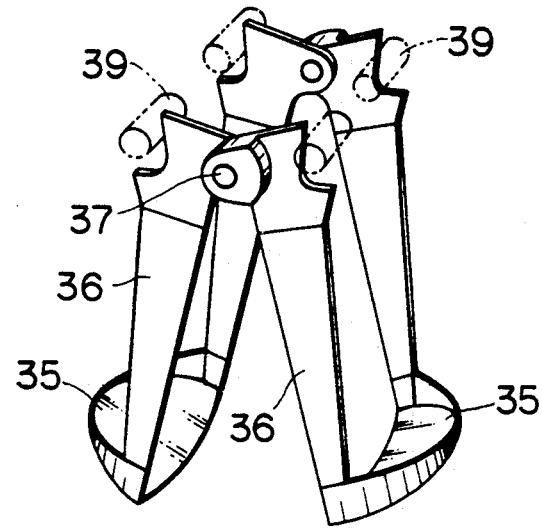
FIG. 23 is a perspective view of the shutter and the lever.
Figure 24:
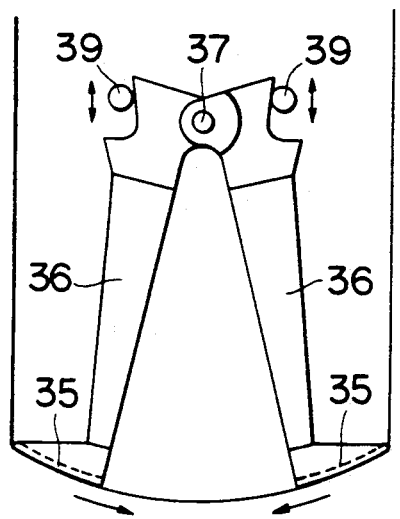
FIG. 24 is a front view showing the shutter in a closed condition.
Figure 25:
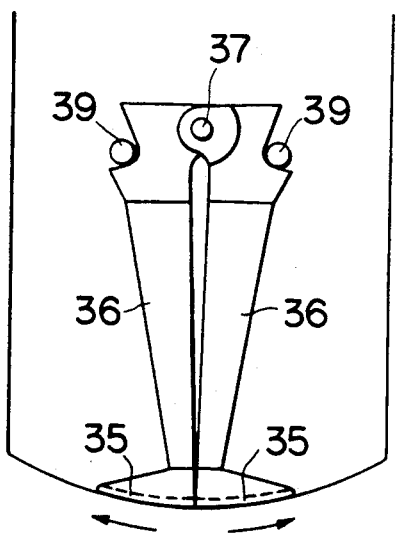
FIG. 25 is a front view showing the shutter in a closed condition.

FIG. 20 to FIG. 33 show the production method and apparatus for wrapping and sealing the solid state food material "S" with two kinds of the clayish state food materials "P" and "Q", forming the same processed food into globular shape. With regard to this second embodiment, a second cavity (24) is set between chamber (22) and cavity (23). Cavity (24) connects to a second extruder (6), through which the second clayish state food material shall be conveyed into second cavity (24). The second layer of second material "Q" is formed between the first layer of material "P" and material "S". Second extruder (6), as explained in extruder (1) previously, has a built-in gear pump mechanism (61) and is equipped with hopper (63) and feathered screw (62). The extruder (6) is operated properly by the power of an inverter motor or similar means. Thus, material "Q" is transferred into its supply path (64) accordingly. Between material "P" and "Q", there lies a small bow shaped shutter (35) (FIG. 21a) dividing these two materials. This shutter (35) is placed in the lower part of lever (36) and in the outside of chamber (22). The upper part of lever (36) is pivotally connected to the outside wall of second cavity (24) by pivot pin (37). On the upper and side part of lever (36), moving cam surface (38) is formed. It coacts with cam pin (39) which corresponds with chamber (22). The up and down movement of cylindrical chamber (22) effects the opening and closing of shutter (35) through lever (36), whereas the flow of second material "Q" is run or stopped. Pushing piston (51) which moves up and down in the inside of chamber (22) has air path (53) on its tip connecting with outside air supply origin (not shown on the drawing), and from its tip, inspiration and expiration of air shall be made.

Except the aforesaid explanations for extruder (1), the means for periodical pushing out (2), gate (3), the means for supplying the solid state food material (4), the means for pushing out work (5) and corresponding mechanism (73) (74) (75) (76) are almost the same constitution as mentioned in the first performance step.

Figure 26:
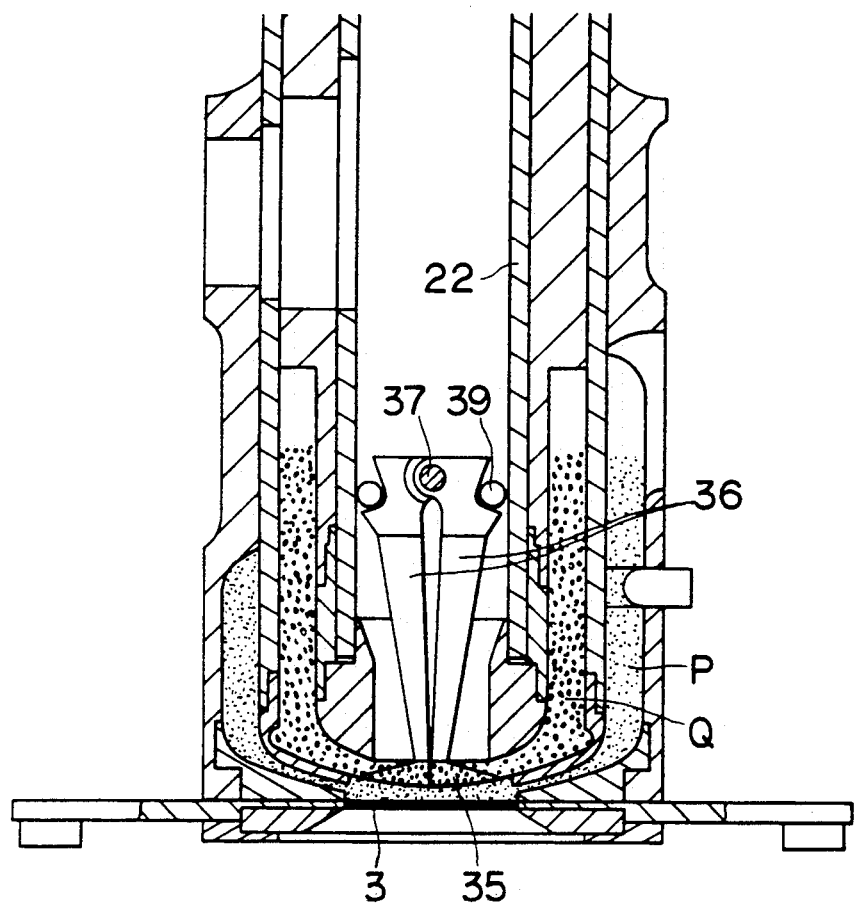
FIG. 26 to FIG. 33 are explanatory drawings of working procedures in accordance with the second performance step.

Referring to FIG. 26–FIG. 33, an explanation shall be give for the second embodiment. FIG. 26 shows the procedure of preparation. Shutter (35) is closed, and first material "P" and second material "Q" are supplied in the space divided by shutter (35) in the condition of layers without mixing up mutually at all, in order that the solid state food material "S" might be wrapped and sealed. On that stage, push piston (51) stays in the upper place than path (43a).

Figure 27:
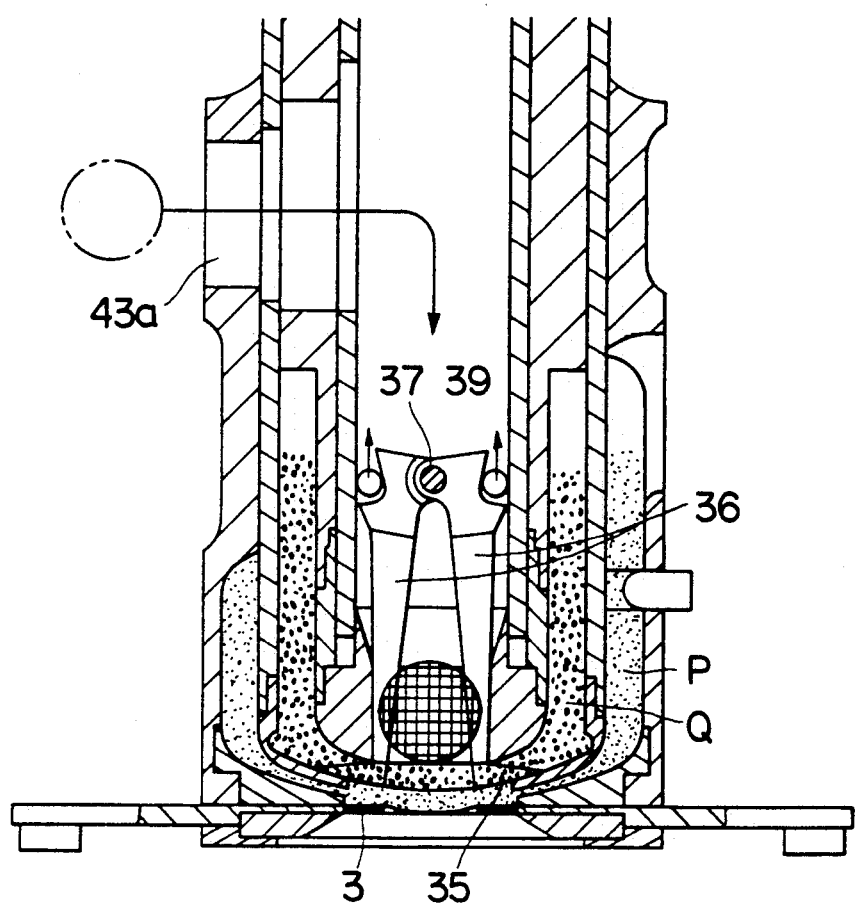
Figure 28:
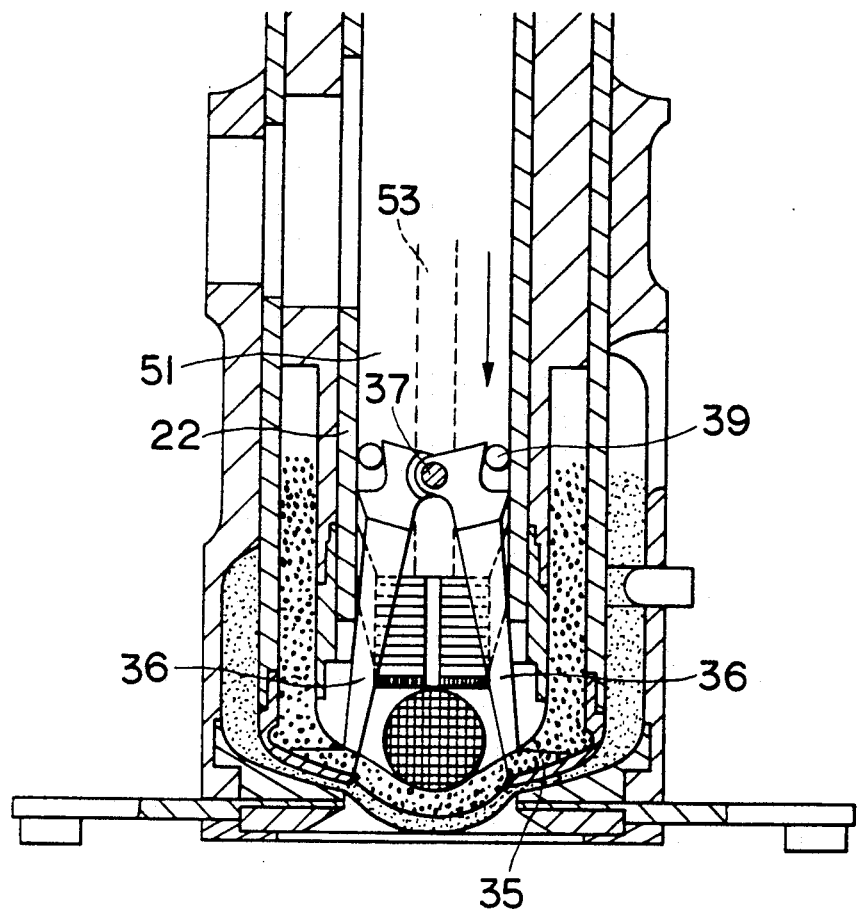

Similar to the first embodiment step, through the means for supplying the solid state food material (4), material "S" is supplied and prepared into chamber (22) and is placed on the upper part of material "Q", when chamber (22) starts to elevate, whereas shutter (35) and gate (3) starts to open. (Ref. FIG. 27). Soon after, push piston (51) starts to come downwards so as to push out material "S" together with first and second clayish state materials "P" and "Q" through open shutter (35) and gate (3). (Ref. FIG. 28).

Figure 29:
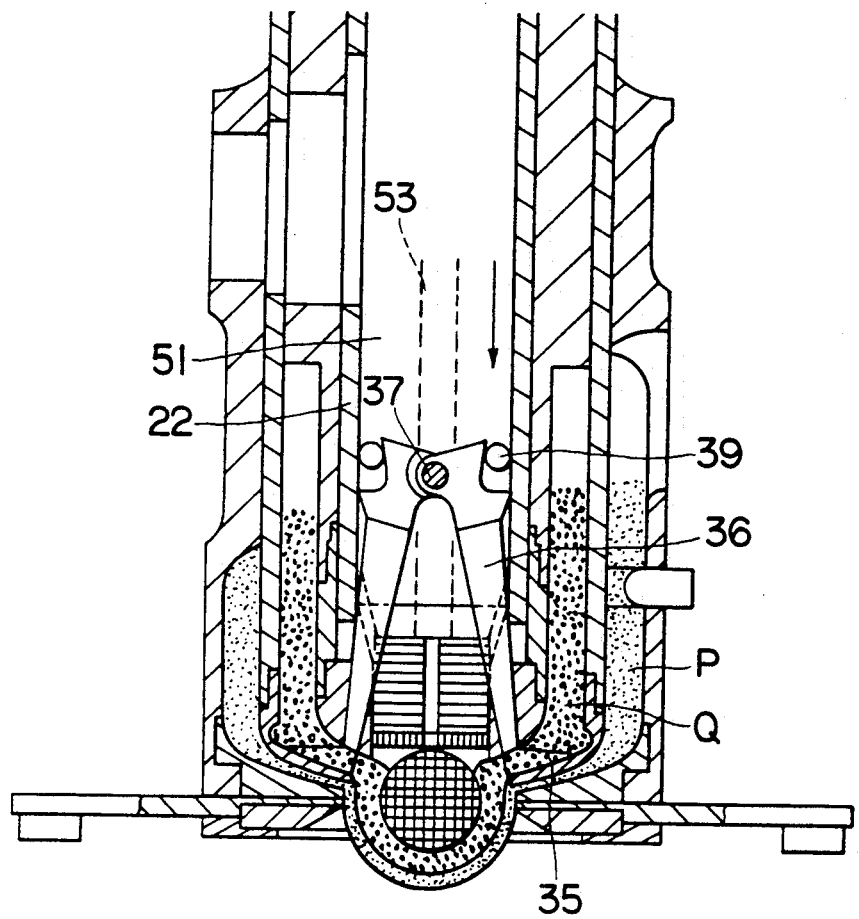
Figure 30:
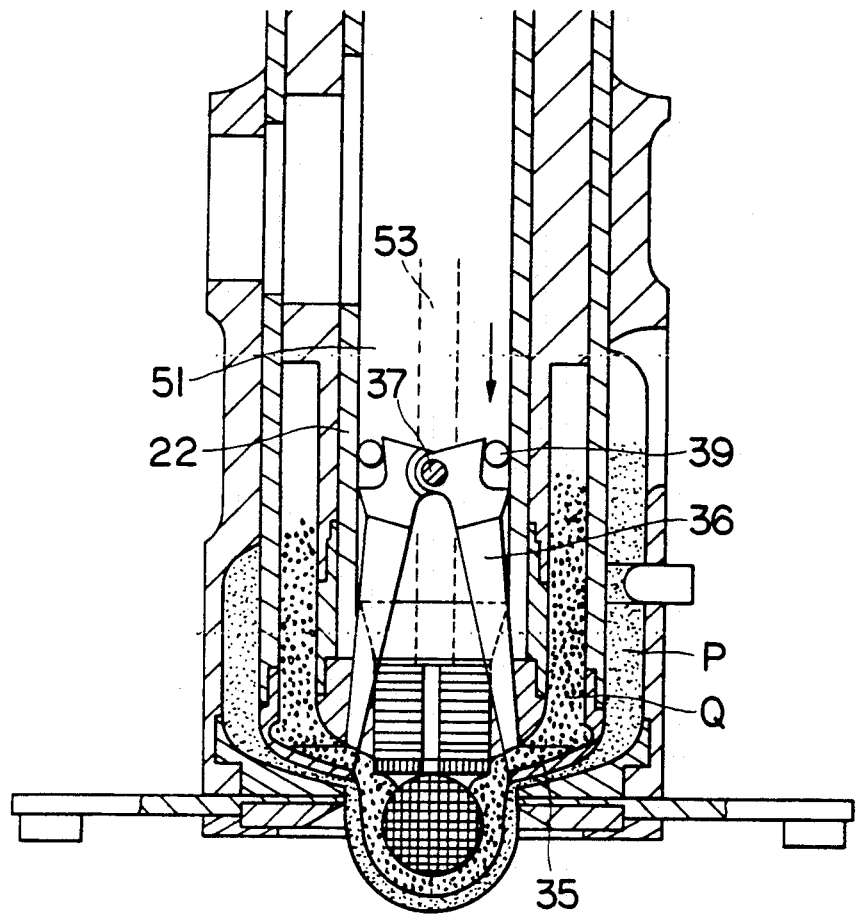
Figure 31:
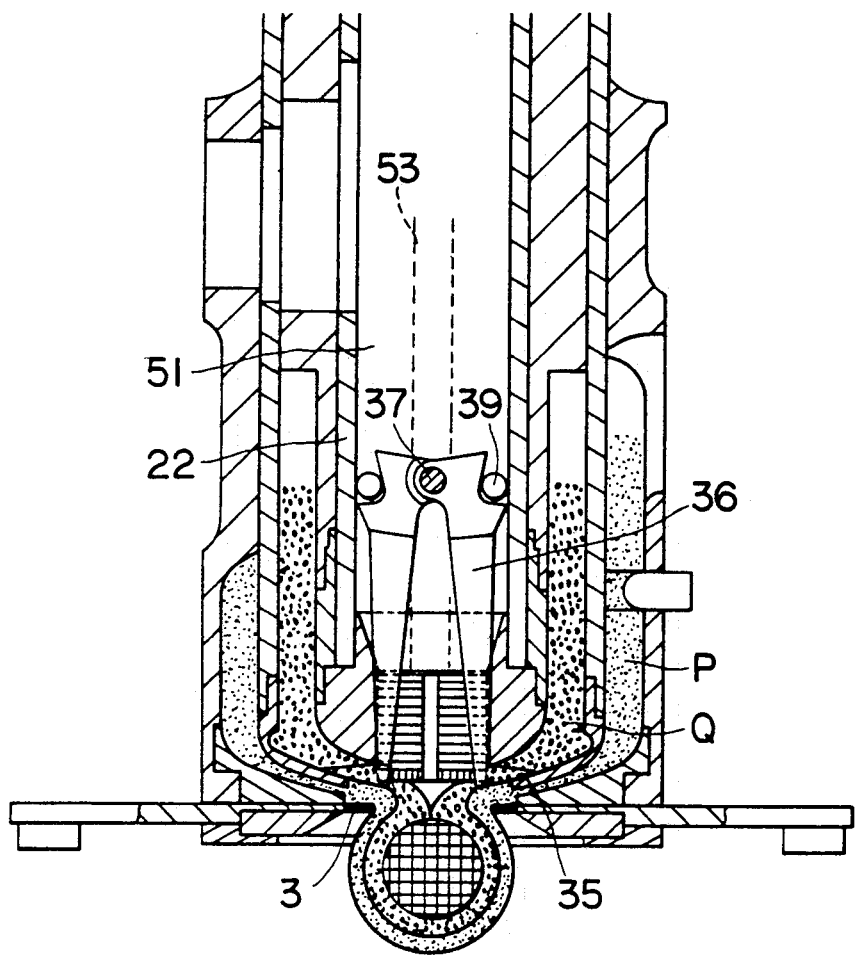

The movement of this pushing out is made as per FIG. 29 and FIG. 30. Then, chamber (22) starts to come down. When material "S" wrapped and sealed with both materials "P" and "Q" is pushed out of gate (3) completely, gate (3) and shutter (35) start to close. (Ref. FIG. 31). Then, in the early stage of this closing action, air existing between material "S" and material "Q" is inspired and expired through air path (53) of push piston (51). Thus, the desirable sticky condition shall be incurred between material "S" and "Q".

Figure 33:
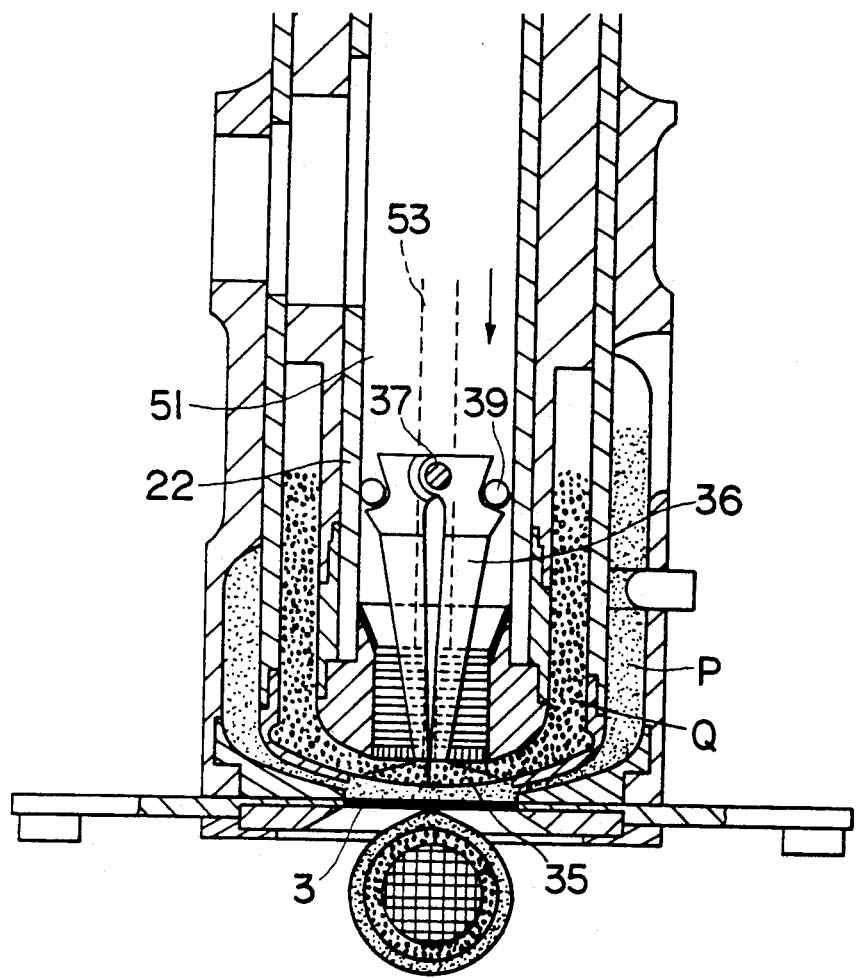

Gate (3) and shutter (35) shall continue to close, as per FIG. 33, and material "S" is thereby doubly wrapped and sealed with two materials "P" and "Q" and shall be formed into globular shape. When shutter (35) is completely closed, the two materials "P" and "Q" are divided in the condition of different "Q" are supplied in the space divided by shutter (35) in the condition of layers without mixing up mutually at all, in order that the solid state food material "S" might be wrapped and sealed. On that stage, push piston (51) stays in the upper place than path (43a).

Similar to the first embodiment step, through the means for supplying the solid state food material (4), material "S" is supplied and prepared into chamber (22) and is placed on the upper part of material "Q", when chamber (22) starts to elevate, whereas shutter (35) and gate (3) starts to open. (Ref. FIG. 27). Soon after, push piston (51) starts to come downwards so as to push out material "S" together with first and second clayish state materials "P" and "Q" through open shutter (35) and gate (3). (Ref. FIG. 28).

The movement of this pushing out is made as per FIG. 29 and FIG. 30. Then, chamber (22) starts to come down. When material "S" wrapped and sealed with both materials "P" and "Q" is pushed out of gate (3) completely, gate (3) and shutter (35) start to close. (Ref. FIG. 31). Then, in the early stage of this closing action, air existing between material "S" and material "Q" is inspired and expired through air path (53) of push piston (51). Thus, the desirable sticky condition shall be incurred between material "S" and "Q".

Gate (3) and shutter (35) shall continue to close, as per FIG. 33, and material "S" is thereby doubly wrapped and sealed with two materials "P" and "Q" and shall be formed into globular shape. When shutter (35) is completely closed, the two materials "P" and "Q" are divided in the condition of different layers without mixing up mutually, and it returns to the initial status of FIG. 26.

Figure 32:
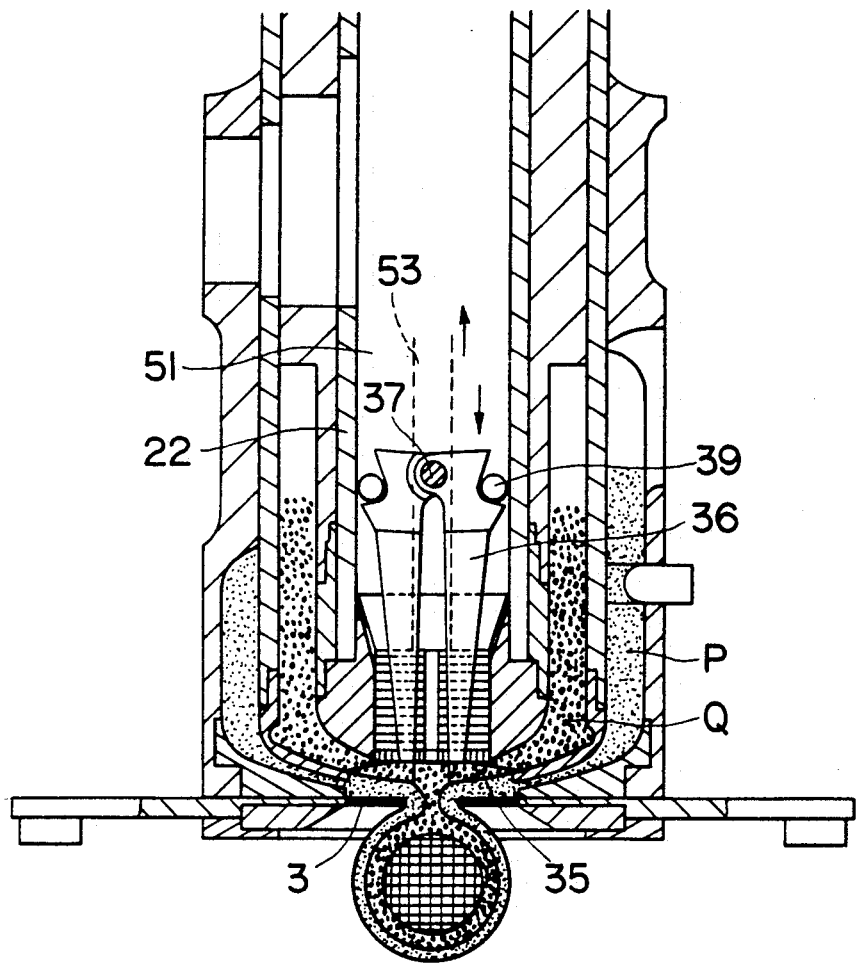

As shown in FIG. 32, just before the above stage that shutter (35) closes completely, push piston (51) is elevated a small amount to inspire air, whereas the sticky clayish state food material is excluded from its tip. In accordance with this second embodiment, it is obtainable that material "S" doubly wrapped and sealed with two materials "P" and "Q" is formed into globular shape.

While the invention has been described in its preferred embodiments, it is to be understood that changes and variations may be made without departing form the spirit and scope of this invention.

What is claimed:

1. A method for forming wrapping and sealing a solid state food material with a state food material, thereby forming a globular product, comprising the steps of:

injecting clayish state food material into a cylindrical mold cavity, thereby forming a cylinder of clayish state food material, the cylinder having an annular side wall and a bottom resting on a gate covering a bottom of the mold cavity;

placing the solid state food material into the cylinder of clayish state food material;

pushing the solid state food material towards the bottom of the cylinder while opening the gate;

closing the gate to thereby envelope the solid state food material in the clayish state food material; and inspiring and expiring air through an air path provided in a push piston used in the pushing step.

2. A method according to claim 1, wherein the injecting step comprises injecting two different types of clayish state food material into concentrically disposed cylindrical mold cavities, thereby forming two cylinders of clayish state food material, each cylinder having an annular side wall and a bottom, an outer one of the two cylinders having a bottom resting on the gate.

3. A method according to claim 1, wherein the gate is a shutter having an opening which closes the side wall of the cylinder of clayish state food material around the solid state food material.

* * * * *